United States Patent
Fu et al.

(10) Patent No.: US 11,765,998 B1
(45) Date of Patent: Sep. 26, 2023

(54) POWER SAW FOR PRUNING TREES

(71) Applicant: SANTAFE TECHNOLOGY LLC, San Marcos, CA (US)

(72) Inventors: Harry Fu, San Marcos, CA (US); Ning Dong, San Marcos, CA (US)

(73) Assignee: SANTAFE TECHNOLOGY LLC, San Marcos, CA (US)

( * ) Notice: Subject to any disclaimer, the term of this patent is extended or adjusted under 35 U.S.C. 154(b) by 0 days.

(21) Appl. No.: 18/136,530

(22) Filed: Apr. 19, 2023

Related U.S. Application Data

(60) Provisional application No. 63/333,689, filed on Apr. 22, 2022.

(51) Int. Cl.
*A01G 3/08* (2006.01)
*B25F 5/02* (2006.01)

(52) U.S. Cl.
CPC .............. *A01G 3/085* (2013.01); *B25F 5/02* (2013.01)

(58) Field of Classification Search
None
See application file for complete search history.

(56) References Cited

U.S. PATENT DOCUMENTS

| | | | |
|---|---|---|---|
| 4,566,188 A | 1/1986 | Wilson | |
| 5,787,536 A | 8/1998 | Pate | |
| 6,484,409 B2 * | 11/2002 | Campbell | B23D 49/162 30/92 |
| 6,901,695 B2 | 6/2005 | Lindroth | |
| 10,091,948 B2 | 10/2018 | Pringnitz | |
| 10,390,493 B2 | 8/2019 | Sinyard | |
| 10,772,261 B1 | 9/2020 | Hooyman | |
| 2013/0139391 A1 * | 6/2013 | Nelson, II | A01G 3/085 30/329 |
| 2016/0249534 A1 * | 9/2016 | Gatten | B23D 51/18 30/392 |
| 2016/0344170 A1 * | 11/2016 | Tamm | B25F 5/02 |
| 2021/0344371 A1 * | 11/2021 | LaMarr, Jr. | A01B 69/00 |
| 2022/0069662 A1 * | 3/2022 | Cyborski | H02K 5/207 |
| 2022/0126122 A1 * | 4/2022 | McCarthy | A62B 3/005 |
| 2022/0311258 A1 * | 9/2022 | Szommer | H01M 50/247 |

* cited by examiner

*Primary Examiner* — Hwei-Siu C Payer
(74) *Attorney, Agent, or Firm* — CP LAW GROUP PC; Cy Bates

(57) ABSTRACT

A power saw for pruning high grown trees is disclosed. The power saw is configured to couple to an extension pole that allows the power saw to reach high hanging targets. The power saw includes a housing having a wireless receiver and a motor subassembly contained therein. A housing battery is electrically coupled to the wireless receiver. A front handle is coupled to the housing. The front handle comprises a faceplate and a pole aperture disposed at a terminal end. A blade is configured to extend through a blade slot of the faceplate wherein the blade is coupled to the motor subassembly. An extension pole is configured to couple to the pole aperture of the front handle. The blade is configured to move upon actuation of a wireless remote control. The wireless remote control includes a wireless transmitter and is configured to allow both hands of a user to handle the extension pole while in operation.

20 Claims, 10 Drawing Sheets

POWER SAW FOR PRUNING TREES

CROSS-REFERENCE TO RELATED APPLICATIONS

This application claims benefit of priority with U.S. Provisional Application Ser. No. 63/333,689, filed Apr. 22, 2022; the entire contents of which are hereby incorporated by reference.

BACKGROUND

Field of the Invention

This invention relates to power tools for pruning trees; and more particularly, a power saw driven by batteries and a wireless remote control.

Description of the Related Art

Power tools like chainsaws are common in pruning trees. But when the target is at a higher elevation, conventional pruning tools normally cannot reach them. Power tools that are normally used for pruning trees are generally heavy and require the operator to keep the power tool close to themselves. Pruners with extension handles like power pole saws generally cannot reach high places from the ground. When pruning high trees, the operator normally has to climb up to the tree which requires special skills and equipment while also increasing the risk of injury. For non-professionals like general homeowners, pruning tall frees this way is difficult and dangerous.

Some manual tools are light enough to be used with a longer handle. However, the user is required to exert manual force to cut a limb. When the target is high, the process can demand great physical strength which is beyond most people's capability.

SUMMARY

The disclosure concerns a power saw for pruning high grown trees. The power saw is driven by batteries and a wireless remote control. The power saw is configured to couple to an extension pole in a manner that allows the power saw to reach high hanging targets.

The power saw comprises a housing having a wireless receiver and motor subassembly contained therein. A housing battery is disposed within a battery compartment and is electrically coupled to the wireless receiver. A front handle is coupled to the housing. The front handle comprises a faceplate and a pole aperture disposed at a terminal end. A blade is configured to extend through a blade slot of the faceplate wherein the blade is coupled to the motor subassembly. An extension pole is configured to coupled to the pole aperture of the front handle. The blade is configured to move upon actuation of a wireless remote control. The wireless remote control comprises a remote housing and a wireless transmitter contained therein.

BRIEF DESCRIPTION OF THE DRAWINGS

Other features, combinations, and embodiments will be appreciated by one having the ordinary level of skill in the art of power tools upon a thorough review of the following details and descriptions, particularly when reviewed in conjunction with the drawings, wherein.

DETAILED DESCRIPTION

Figure 1:
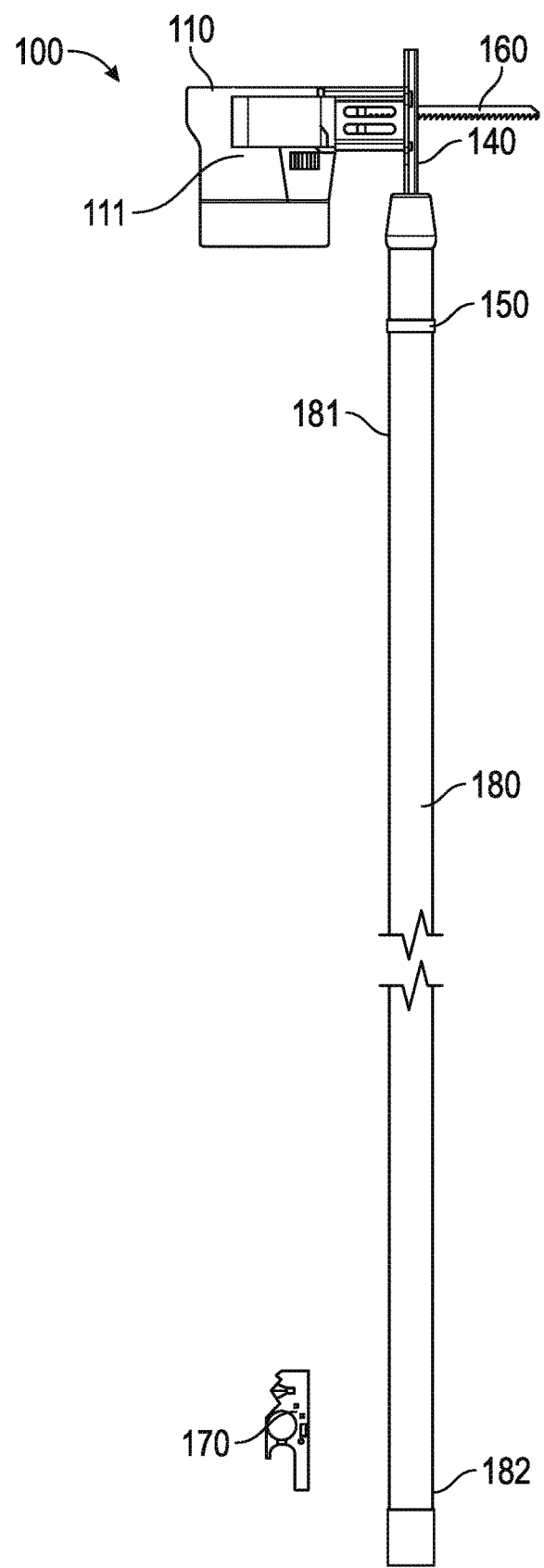
FIG. 1 shows a side view of a power saw system in accordance with a first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

Unless explicitly defined herein, terms are to be construed in accordance with the plain and ordinary meaning as would be appreciated by one having skill in the art.

GENERAL DESCRIPTION OF EMBODIMENTS

In one embodiment, a power saw system is disclosed. The power saw system comprises a housing having a proximal end and a distal end opposite the body proximal end, the housing comprising a wireless receiver and a motor subassembly, a housing battery electrically coupled to the wireless receiver, a front handle comprising a faceplate and a pole aperture disposed at a terminal end, the faceplate coupled to the housing wherein the faceplate comprises a blade slot, a blade extending through the blade slot of the faceplate, the blade coupled to the motor subassembly, an extension pole comprising a first end and a second end opposite the first end, the first end configured to couple to the pole aperture of the front handle, and a wireless remote control comprising a remote housing extending from a front side to a back side, the remote housing further comprises a wireless transmitter and a remote battery disposed within the remote housing, the wireless transmitter being configured to communicate with the wireless receiver and further configured to be held against the extension pole during operation wherein the blade is configured to move upon actuation of the wireless remote control.

In some embodiments, the faceplate may further comprise a ridge extending along a center of the faceplate, the ridge comprising a ridge inner surface facing the housing, a ridge outer surface opposite the ridge inner surface, and a ridge width.

In some embodiments, the housing may further comprise a housing width wherein the housing width is greater than the ridge width.

In some embodiments, the system may further comprise a support roller coupled to the ridge inner surface, the support roller configured to engage with the jigsaw blade to provide stability.

In some embodiments, the system may further comprise a secondary support roller coupled to the ridge inner surface, the second support roller disposed on an opposite side of the jigsaw blade from the support roller.

In some embodiments, the wireless remote control may further comprise a finger aperture extending through the remote housing.

In some embodiments, the wireless remote control may further comprise a curved nook disposed below the finger aperture.

In some embodiments, the wireless remote control may further comprise an actuator disposed on the front side of the housing wherein the actuator is positioned above the finger aperture. The actuator may comprise a throttle.

In some embodiments, the back side of the remote housing may be configured to removably engage with the extension pole to allow gripping of the wireless remote control and the extension pole to be held in a same hand of a user.

In some embodiments, the housing may further comprise a main body, a battery compartment configured to hold the housing battery, and a faceplate junction wherein the battery compartment is disposed below the main body. The battery compartment may be removably coupled to the main body. In other embodiments, the battery compartment may be fixedly coupled to the main body.

In some embodiments, the main body may further comprise a motor region configured to surround a motor of the motor subassembly, the motor region comprising a slanted wall and a vent outlet disposed on a widest portion of the slanted wall.

In another embodiment, a power saw system is disclosed. The power saw system comprises a housing having a proximal end and a distal end opposite the body proximal end, the housing comprising a wireless receiver and a motor subassembly, a housing battery electrically coupled to the wireless receiver, a front handle comprising a faceplate and pole aperture disposed at a terminal end, the faceplate coupled to the housing wherein the faceplate comprises a blade slot, and further wherein the pole aperture is configured to receive an extension pole, a blade extending through the blade slot of the faceplate, the blade coupled to the motor subassembly; and a wireless remote control comprising a remote housing extending from a front side to a back side, the remote housing further comprises a wireless transmitter and a remote battery disposed within the remote housing, wherein the wireless transmitter is configured to communicate with the wireless receiver, wherein the blade is configured to move upon actuation of the wireless remote control.

In some embodiments, the faceplate may further comprise a ridge extending along a center of the faceplate, the ridge comprising a ridge inner surface facing the house, a ridge outer surface opposite the ridge inner surface, and a ridge width.

In some embodiments, the housing may further comprise a housing width wherein the housing width is greater than the ridge width.

In some embodiments, the system may further comprise a support roller coupled to the ridge inner surface, the support roller configured to engage with the blade to provide stability.

In some embodiments, the system may further comprise a secondary support roller coupled to the ridge inner surface, the second support roller disposed on an opposite side of the blade from the support roller.

In some embodiments, the wireless remote control may further comprise a finger aperture extending through the remote housing.

In some embodiments, the wireless remote control may further comprise a curved nook disposed below the finger aperture.

In some embodiments, the wireless remote control may further comprise an actuator disposed on the front side of the housing wherein the actuator is positioned above the finger aperture. The actuator may comprise a throttle.

In some embodiments, the back side of the remote housing may be configured to removably engage with the extension pole to allow gripping of the wireless remote control and the extension pole to be held in a same hand of a user.

In some embodiments, the housing may further comprise a main body, a battery compartment configured to hold the housing battery, and a faceplate junction wherein the battery compartment is disposed below the main body.

In some embodiments, the battery compartment may be removably coupled to the main body. In yet other embodiments the battery compartment may be fixedly coupled to the main body.

In some embodiments, the main body may further comprise a motor region configured to surround a motor of the motor subassembly, the motor region comprising a slanted wall and a vent outlet disposed on a widest portion of the slanted wall.

In another embodiment, a power saw is disclosed. The power saw comprises a housing having a proximal end and a distal end opposite the body proximal end, the housing comprising a wireless receiver and a motor subassembly, a housing battery electrically coupled to the wireless receiver, a front handle comprising a faceplate and a pole aperture disposed at a terminal end, the faceplate coupled to the housing wherein the faceplate comprises a blade slot, and further wherein the pole aperture is configured to receive an extension pole, and a blade extending through the blade slot of the faceplate, the blade being coupled to the motor subassembly.

In some embodiments, the faceplate may further comprise a ridge extending along a center of the faceplate, the ridge comprising a ridge inner surface facing the house, a ridge outer surface opposite the ridge inner surface, and a ridge width.

In some embodiments, the housing may further comprise a housing width wherein the housing width is greater than the ridge width.

In some embodiments, the system may further comprise a support roller coupled to the ridge inner surface, the support roller configured to engage with the blade to provide stability.

In some embodiments, the system may further comprise a secondary support roller coupled to the ridge inner surface, the second support roller disposed on an opposite side of the jigsaw blade from the support roller.

In some embodiments, the housing may further comprise a main body, a battery compartment configured to hold the housing battery, and a faceplate junction wherein the battery compartment is disposed below the main body.

In some embodiments, the battery compartment may be removably coupled to the main body. In yet other embodiments, the battery compartment may be fixedly coupled to the main body.

In some embodiments, the main body may further comprise a motor region configured to surround a motor of the motor subassembly, the motor region comprising a slanted wall and a vent outlet disposed on a widest portion of the slanted wall.

Each of the components of the power saw and related system described herein may be manufactured and/or assembled in accordance with the conventional knowledge and level of a person having skill in the art. Materials such as metal (aluminum, steel, and the like) can be utilized for particular components including the motor subassembly, the faceplate, and the jigsaw blade. Materials such as thermoplastics can be used for components such as the housing and front handle.

While various details, features, combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

Illustrated Embodiments

Now turning the drawings, FIG. 1 shows a power saw system (100) in accordance with a first illustrated embodiment. The power saw system comprises a saw head (110) coupled to a front handle (140). The front handle is further coupled to an extension pole (180) at a terminal end (150) thereof. The saw head comprises a housing (111) wherein the housing surrounds a variety of mechanical and electrical components including a motor subassembly, a wireless receiver, and a housing battery. The housing battery can be electrically coupled to the wireless receiver, the motor subassembly, or both. A blade (160) is coupled to the motor subassembly and extends through the front handle. The extension pole comprises a first end (181) coupled to the front handle and a second end (182) opposite the first end which is handled by an operator. While the operator holds the extension pole near the second end with both hands, the operator can simultaneously hold a wireless remote control (170) in either hand. The blade is configured to move upon actuation of the wireless remote control by the operator.

As shown, the blade (160) comprises a single sided jigsaw blade. Other types of blades can also be utilized including reciprocating blades or any other kind of blade that can be appreciated by one having skill in the art. Double sided blades can also be utilized depending on application, such as cutting top and bottom sides of a same branch. The extension pole (180) can be chosen according to height needed to reach for pruning. Because the saw head (110) is battery powered and controlled wirelessly, a longer extension pole, such as 25 ft. to 30 ft. could be utilized. The front handle (140) is an interface to the extension pole and to a cutting object, such as a tree branch. The front handle includes a pole aperture (FIG. 2, 151) comprising a universal thread.

Figure 2:
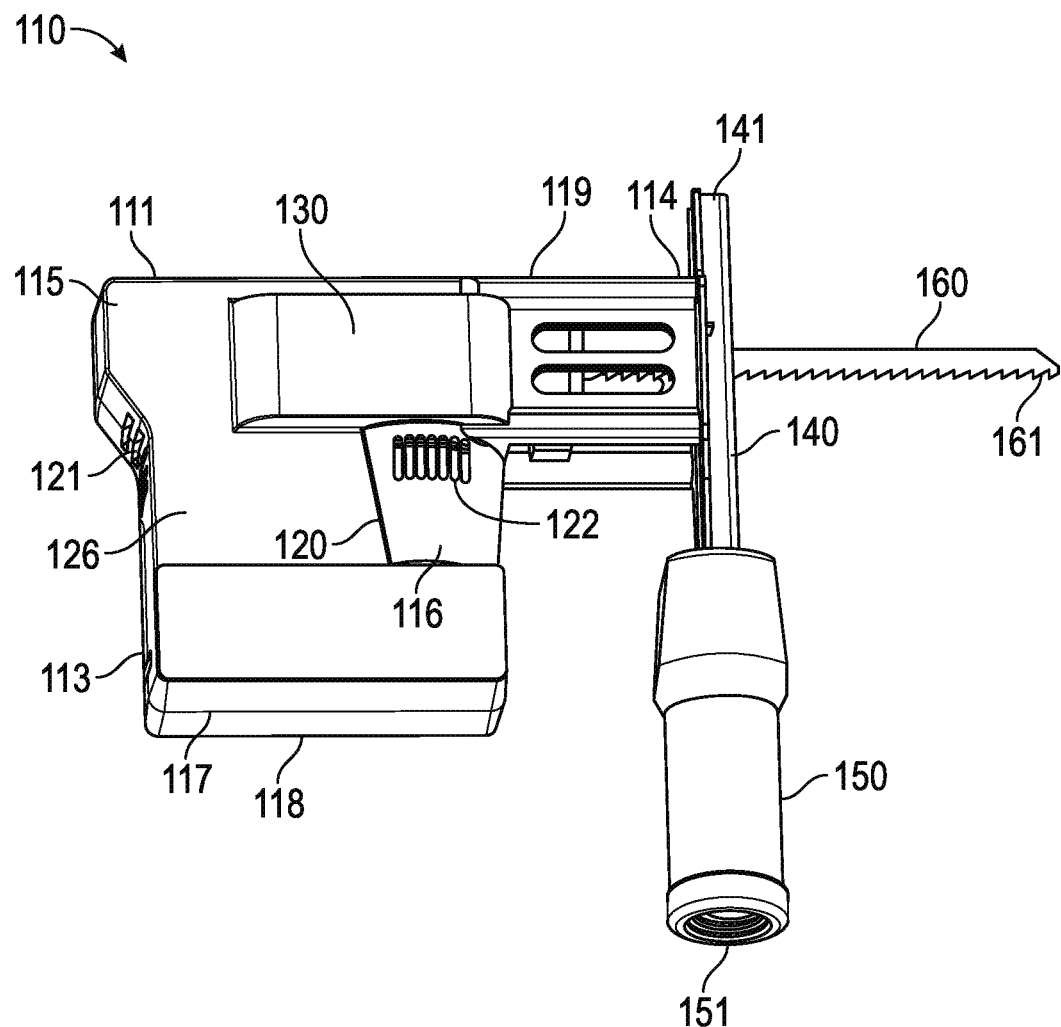
FIG. 2 shows a perspective view of a saw head according to the first illustrated embodiment.

FIG. 2 shows a perspective view of a saw head (110) according to the first illustrated embodiment. The saw head comprises a housing (111) extending from a proximal end (113) to a distal end (114). The housing further comprises a housing width extending in an orthogonal direction from the proximal end to the distal end. The housing includes a plurality of regions including a main body (115), a motor region (116), a battery compartment (117) and a faceplate junction (119). The battery compartment is disposed below the main body in order to act as a counter balance to a blade (160). In other embodiments, the battery compartment is not integrally formed with the housing but instead is removably coupled to the housing such as a replaceable battery pack. When the blade is in operation, weight from a housing battery (118) disposed in the battery compartment is configured to lift the blade upwards while the jigsaw blade moves forward to aid in the reduction of back force.

The motor region (116) comprises a slanted wall (120) and a vent outlet (122) disposed on an upper half of the motor region. The motor region is configured to house a motor of a motor subassembly (130) disposed within the housing (111). As the motor rotates, air within the motor region is directed upward due to the slanted wall, thereby causing air to escape the vent outlet and create a lower pressure below the vent outlet. Air is then directed upward creating airflow between the vent outlet and a vent inlet (121) to aid in cooling interior components of the housing. In alternative embodiments, the vent outlet is disposed on a lower half of the motor region, in which case air is directed downward and out of the vent outlet creating a similar air flow.

The saw head (110) is coupled to a front handle (140). The front handle is configured to couple to an extension pole (FIG. 1, 180) via a pole aperture (151). The pole aperture is disposed on a terminal end (150) of the front handle and may comprise a universal thread such as 1¾"-5 UNC. The front handle further comprises a faceplate (141) coupled to the faceplate junction (119) at the distal end (114) of the housing (111). The blade (160) comprises a blade tip (161) extending away from the faceplate. The blade is coupled to the motor subassembly (130) and extends through the faceplate such that the faceplate is configured to contact a tree branch during operation. The front handle is a connection adapter for the saw head which is mounted on the saw head by screws. As shown, the front handle comprises an overmolded part molded to the faceplate at plastic lower section of the front handle. It is preferable that the saw head comprises a lighter weight so that a longer extension pole can be used for pruning high branches.

Figure 7:
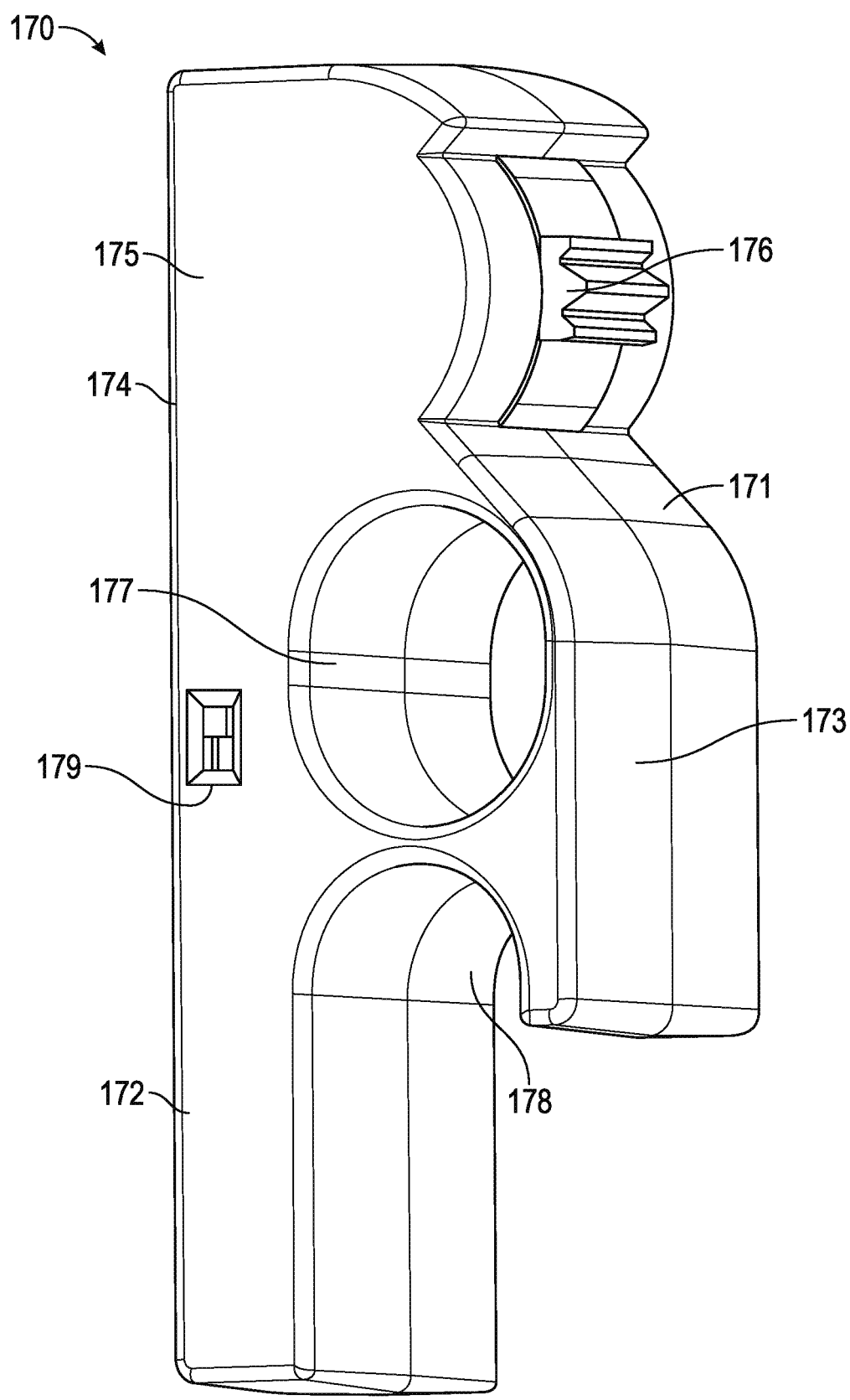
FIG. 7 shows a perspective view of a wireless remote control according to the first illustrated embodiment.

The housing battery (118) is assembled in the housing (111) which provides power to the motor via an electronic controller. The electronic controller's circuit comprises two function modules. One function module is a motor drive module which controls the motor speed and provides necessary protections to the motor and the housing battery, including motor jamming protection and battery over-discharge protection. Another module is a communication module to communicate with a wireless remote control (FIG. 7, 170). The wireless remote control is located in the operator's hand when pruning. The communication module is electrically coupled to the motor drive module such that the communication module relays the operator's command to the motor drive module.

Figure 3:
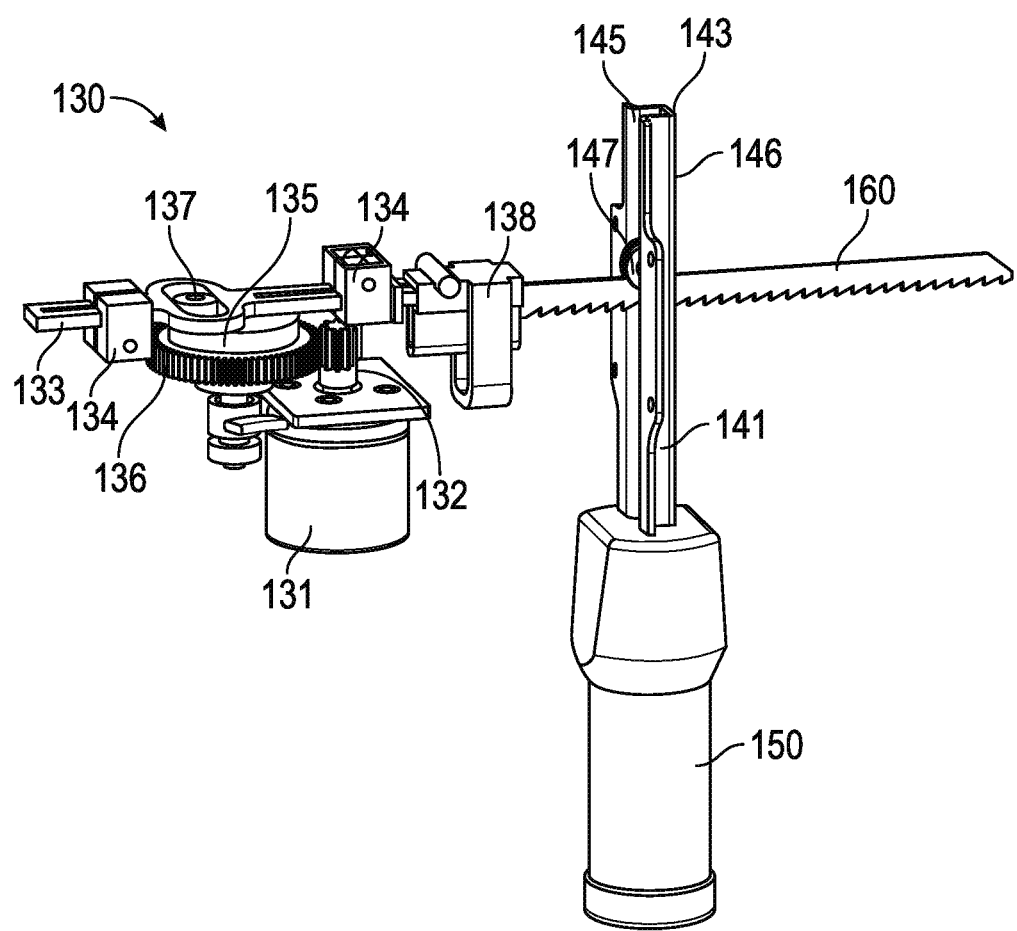
FIG. 3 shows a perspective view of a motor subassembly according to the first illustrated embodiment.

FIG. 3 shows a perspective view of a motor subassembly (130) according to the first illustrated embodiment. The motor subassembly is configured to convert rotation from a motor (131) to a reciprocating movement of a key (133). The key slides inside two linear bearings (134). The central drive (135) has a drive gear (136) which engages with a motor pinion (132) on a shaft of the motor. When the motor runs, the central drive shaft rotates at a lower speed. An eccentric roller (137) then drives the key to move back and forth. The motor may comprise a myriad of configurations as can be appreciated by one having skill in the art. In one embodiment, the motor comprises a brushless DC motor.

Figure 4:
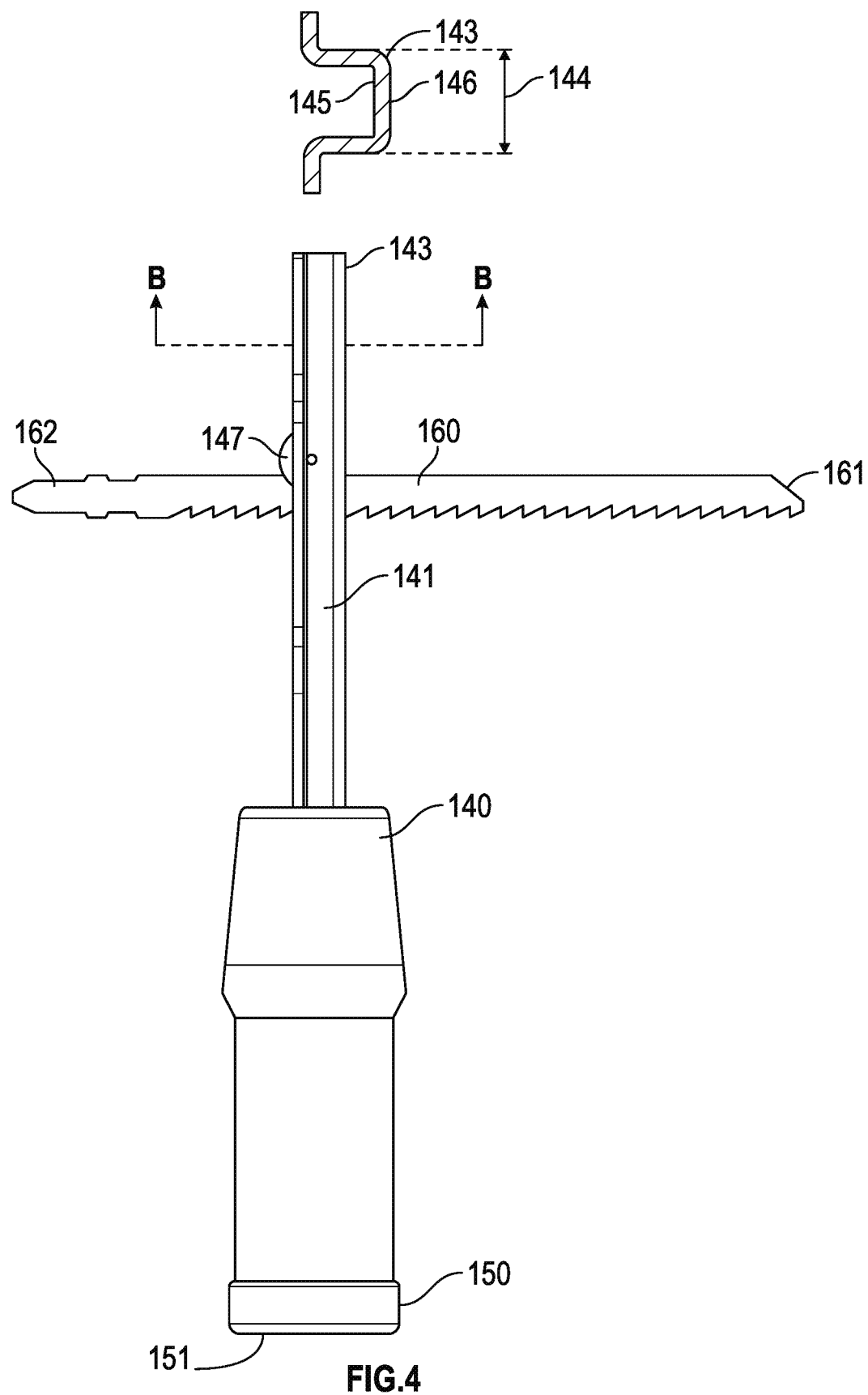
FIG. 4 shows a side view of a front handle according to the first illustrated embodiment.

A blade (160) is coupled to a clamp (138) of the motor subassembly (130) at a blade attachment end (FIG. 4, 162). The blade extends through the faceplate (141) at a blade slot (FIG. 5, 148) thereof. The faceplate includes a ridge (143) having a ridge outer surface (146) and a ridge inner surface (145) opposite the ridge outer surface. A support roller (147) is disposed within the ridge at the ridge inner surface and is positioned vertically above the jigsaw blade. The support roller is configured to provide stability to the blade during operation.

FIG. 4 shows a side view of a front handle (140) according to the first illustrated embodiment. The front handle comprises a faceplate (141) at an upper section and a pole aperture (151) disposed at a lower section. The faceplate comprises a ridge (143) extending towards a blade tip (161) of a blade (160). The ridge includes a ridge outer surface (146) and a ridge inner surface (145). The ridge inner surface comprises a support roller (147) for providing stability to the jigsaw blade. The ridge outer surface comprises a flat surface and is configured to abut a tree branch during pruning. In other embodiments the ridge outer surface may comprise a curve surface. As shown the flat surface of the ridge outer surface is orthogonal to the jigsaw blade.

The ridge (143) further comprises a ridge width (144) wherein the ridge width is less than a housing width of the power saw system. The narrower ridge width allows sawing to be at more convenient angles. Wider surface areas are undesirable for cutting branches because the wider surface area causes the blade and body to move side to side. A wide ridge would force the blade into an orthogonal alignment even if the blade is not positioned in one thereby causing movement, shaking, or buckling.

Figure 5:
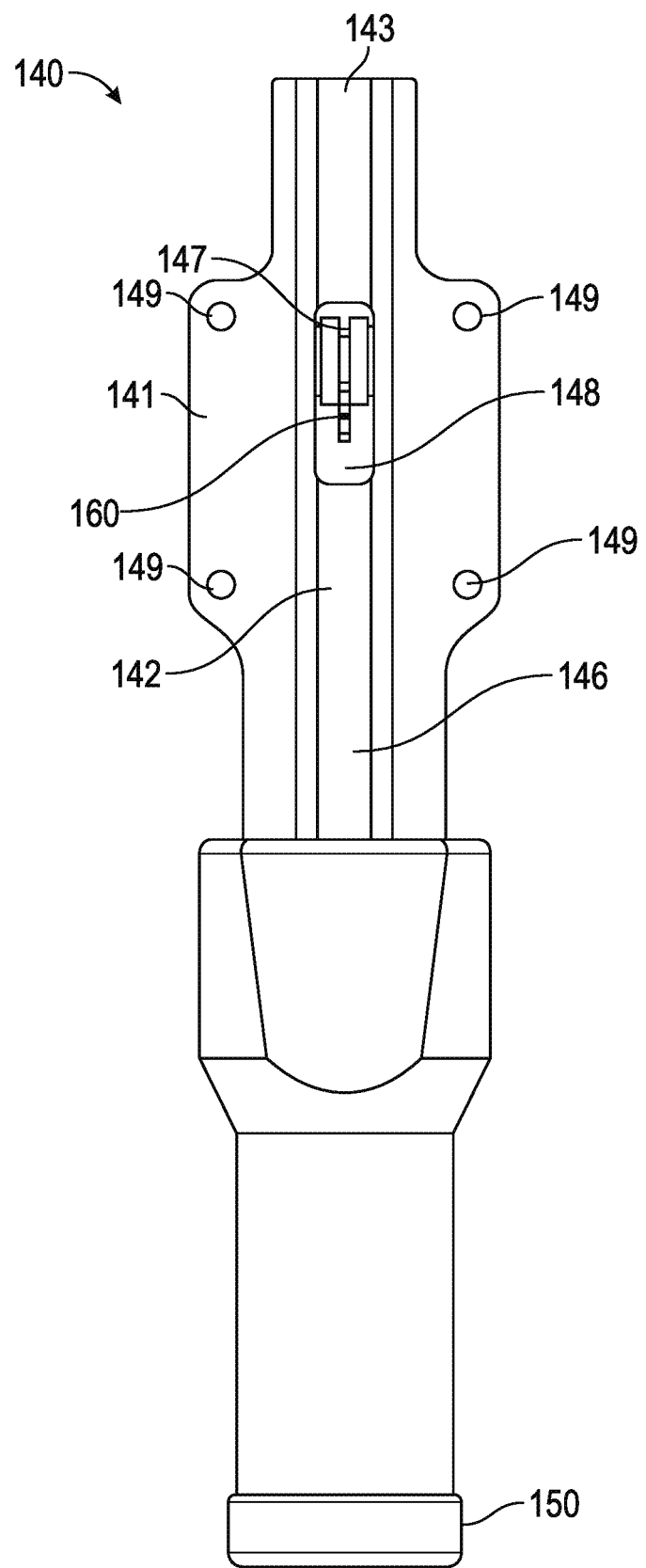
FIG. 5 shows a front view of the front handle according to the first illustrated embodiment.

FIG. 5 shows a front view of the front handle (140) according to the first illustrated embodiment. The front handle includes a faceplate (141) having a ridge (143) extending down a center (142) of the faceplate. The front handle further comprises a plurality of housing attachment apertures (149) which are configured to couple to a faceplate junction (FIG. 2, 119). Disposed at the center of the faceplate, and subsequently the ridge, is a blade slot (148) configured to allow a blade (160) to translate therethrough. Disposed above the blade is a support roller (147) wherein the support roller is configured to provide stability to the blade during operation.

Figure 6B:
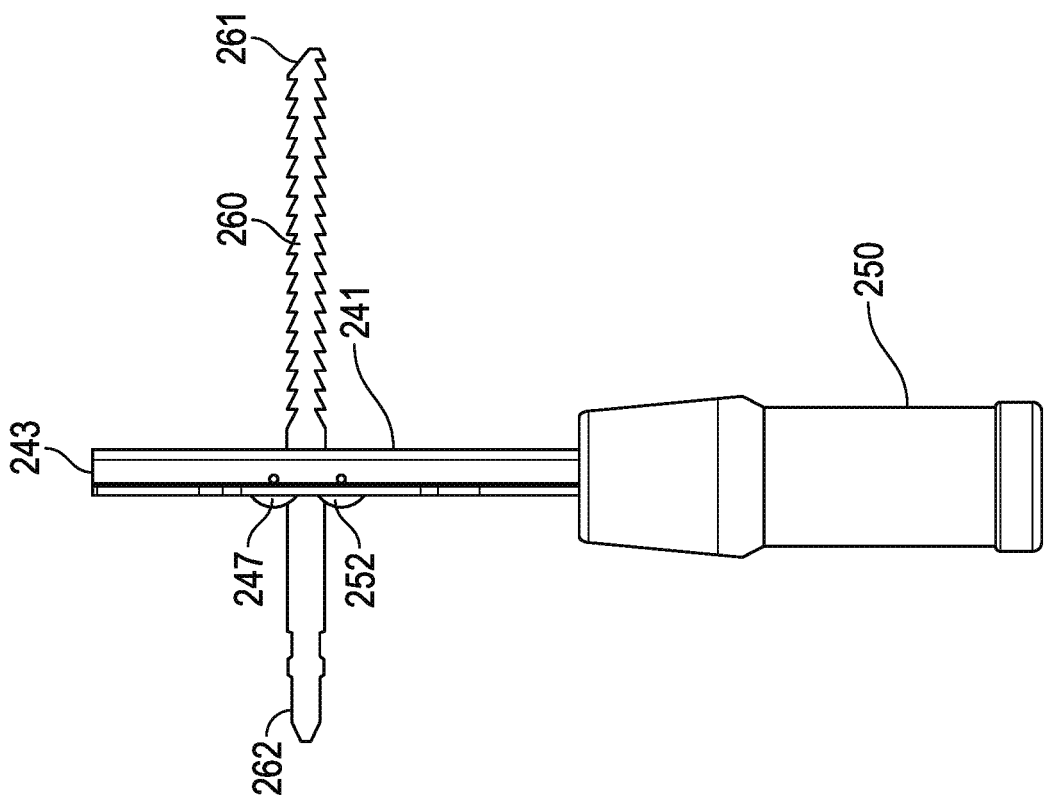
FIG. 6B shows a side view of the front handle according to the second illustrated embodiment.
Figure 6A:
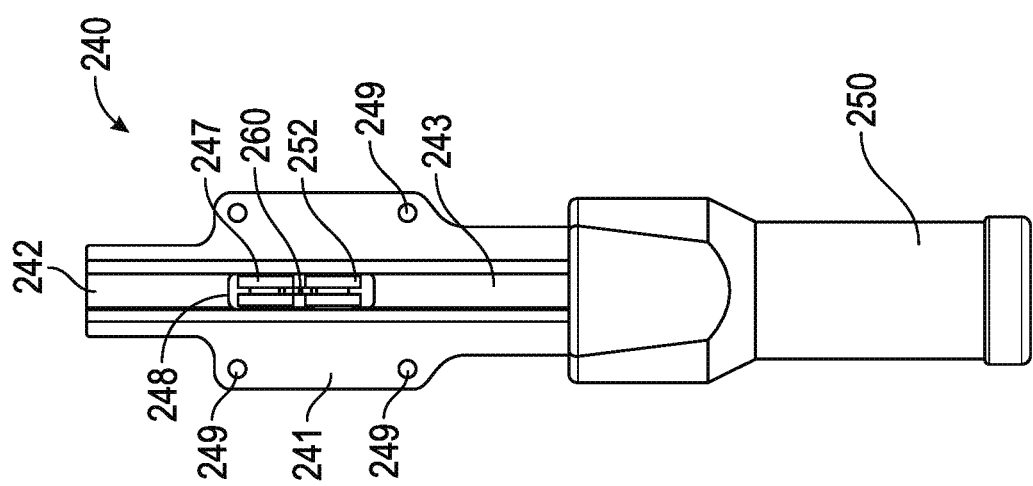
FIG. 6A shows a front view of a front handle in accordance with a second illustrated embodiment.

FIGS. 6A and 6B show a front handle (240) in accordance with a second illustrated embodiment. Here, the front handle comprises a support roller (247) and a secondary support roller (252) wherein the support roller and secondary support roller are disposed on opposites sides of a blade (260). The secondary support roller provides additional stability which can be especially advantageous while cutting upwards. It will be appreciated by one having skill in the art that the blade preferably comprises partial teeth, either single sided or double sided, so as to avoid having the teeth contacting either support roller. In the present embodiment, the blade is supported sawing upwards and downwards. The blade comprises a first row of teeth on a bottom side of the blade and a second row of teeth on a top side of the blade. The first row extends along the blade at a first length and the second row extends along the blade at a second length wherein the first length is equal to the second length. The support roller provides support to the top side and the second support roller provides support to bottom side. As shown the first row and second row comprise a same sized teeth and a mirror configuration of a teeth pattern.

Figure 8:
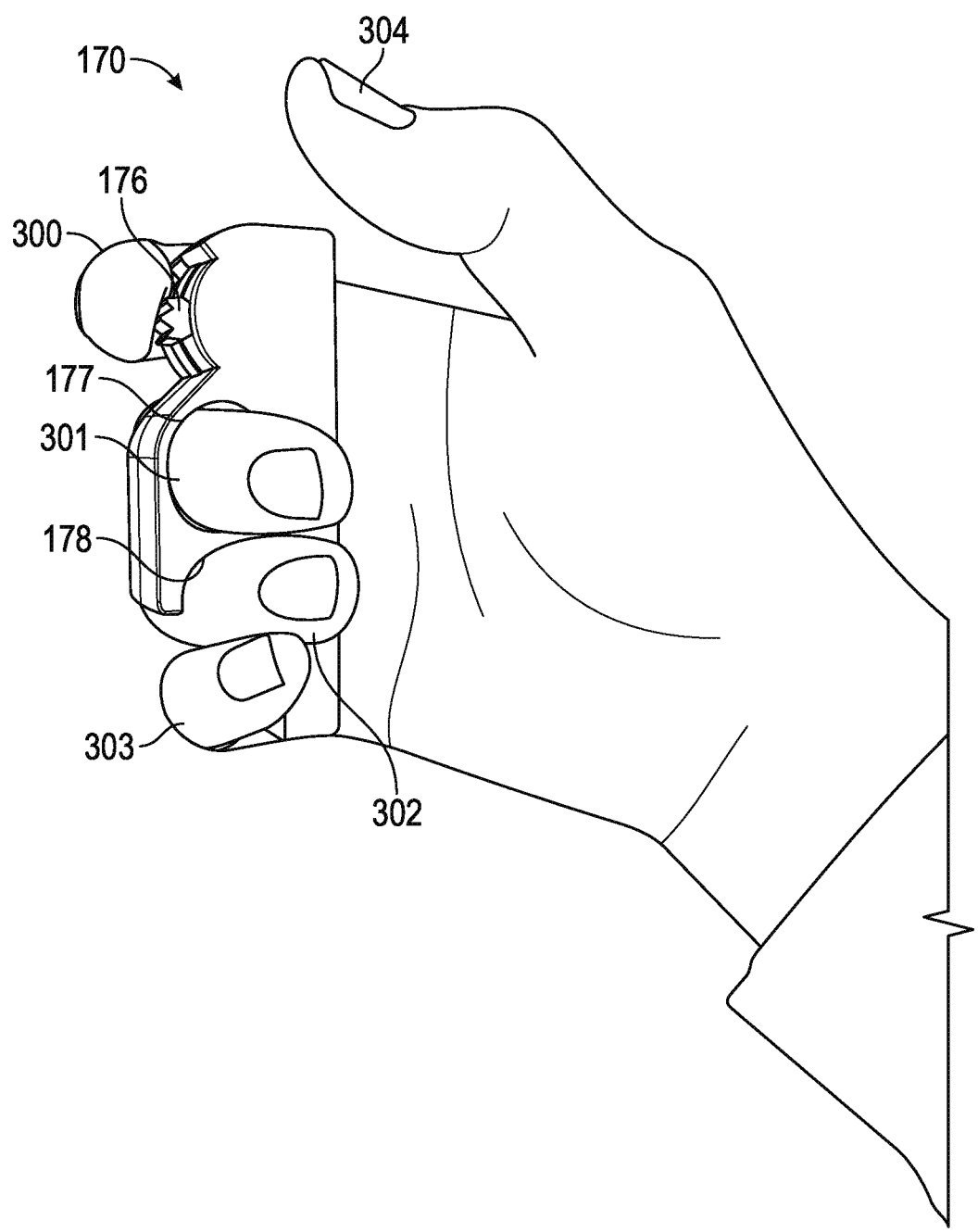
FIG. 8 shows a side view of an operator holding the wireless remote control according to the first illustrated embodiment.
Figure 9:
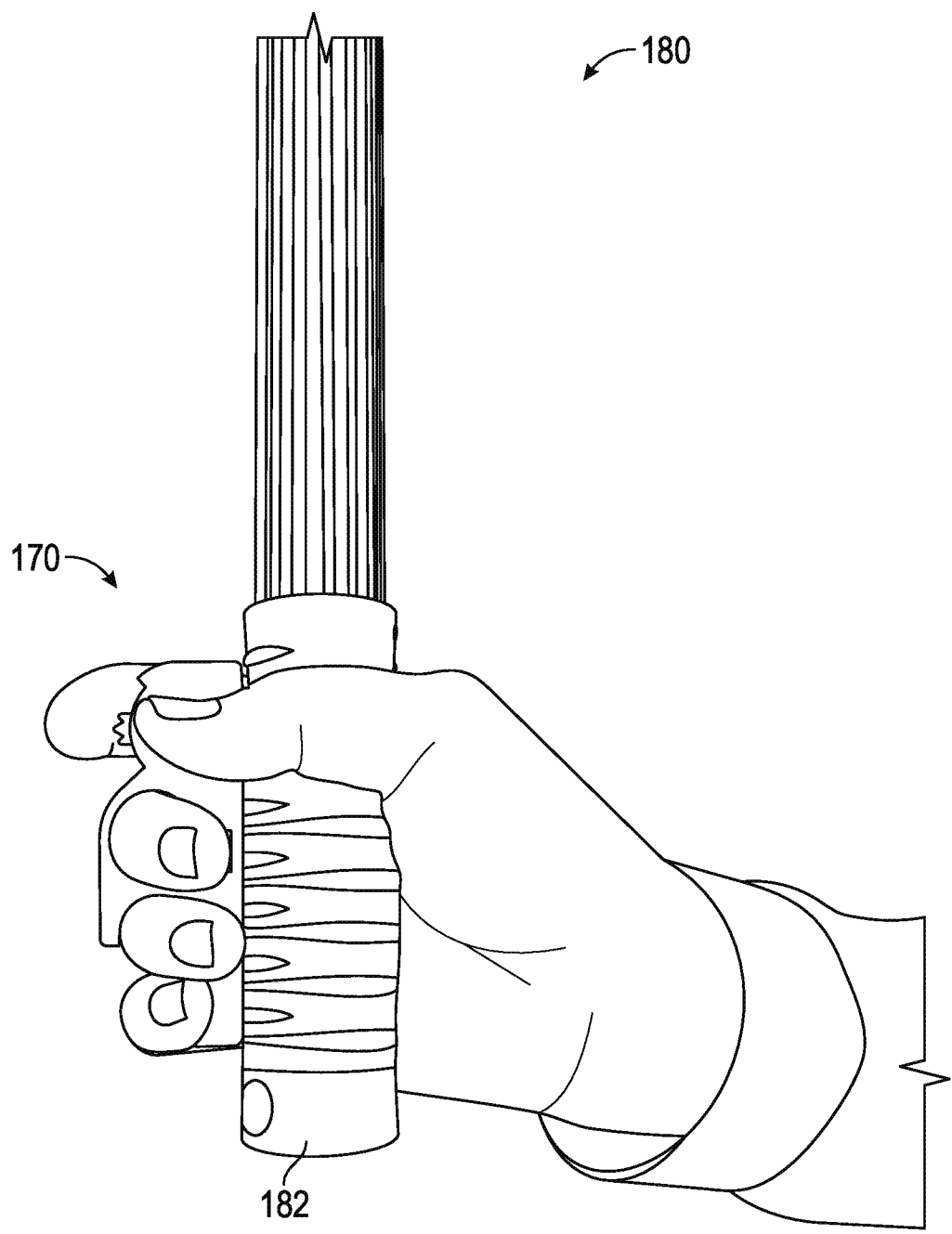
FIG. 9 shows a side view of the operator holding the wireless remote control with an extension pole according to the first illustrated embodiment.

FIG. 7-9 show a wireless remote control (170) according to the first illustrated embodiment. The wireless remote control comprises a remote housing (171) extending from a back side (174) to a front side (173). The remote housing includes a remote battery (172) and a remote transmitter (175) for communication with a wireless receiver (FIG. 2, 126) of the saw head). Power to the wireless remote control can be turned on via a remote switch (179). The wireless remote control includes a finger aperture (177) extending through the remote housing. An actuator (176) is disposed on the front side of the remote housing and preferably positioned above the finger aperture. A curved nook (178) is positioned below the finger aperture for providing greater ergonomics. As shown the actuator comprises a throttle. Other types of actuators may also be utilized including buttons, switches, and the like. It will be appreciated that the wireless remote control may further comprise a battery charging port for recharging of the remote battery.

The wireless remote control (170) allows an operator to control a saw head (FIG. 1, 110). Commands from the actuator (176) are sent via wireless signal to a wireless receiver of the saw head. The remote housing (171) comprises a profile to enable a user to operate the wireless remote control in one hand while also gripping an extension pole (180) with the same hand at the same time.

The wireless remote control (170) may comprise a variety of wireless communication protocols including FM, Bluetooth, or the like. In one embodiment, the wireless communication protocol comprises a modified Bluetooth communication protocol that prevents other devices from communicating and connecting to either the wireless remote control or the saw head. In some embodiments, wireless communication is one way such that the saw head comprises a wireless receiver and the wireless remote control comprises a wireless transmitter. In other embodiments, the communication is two-way such that both the saw head and the wireless remote control each comprise a receiver and transmitter, such as a transceiver. In some embodiments, the communication protocol may be two-way but information flow is broadcasted, such as from the wireless remote control to the saw head.

In one embodiment, the user holds the wireless remote control (170) with a middle finger (301) extending through the finger aperture (177) and pushes the actuator (176) with an index finger (300). The user's ring finger (302) and small finger (303) can rest against the curved nook (178) so to balance the pushing force on the actuator. Together with a thumb (304) on an opposite side, a grabbing force can be formed. When operating the remote control, the same hand can hold the wireless remote control and the extension pole. The middle finger, the ring finger and the small finger each hold the wireless remote control against the extension pole on one side with the thumb applying pressure to the extension pole on an opposite side with the index finger controlling the actuator. It will be appreciated by one having skill in the art that there is a myriad of other ways to handle the wireless remote control during operation with the extension pole.

The wireless remote control (170) is independent and separate from the extension pole (180). The wireless remote control is configured to disengage or detach from the extension pole and is not be fixedly thereto. This detachable feature gives better handling of the extension pole during operation. If the wireless remote control were fixedly coupled to the extension pole, the operator would have to maintain position of one of their hands in the same location during use of the power saw system. With the detachability feature as disclosed herein, the operator can handle the extension pole in any manner they wish. If the operator needs to cut branches at different heights on a tree, the operator can simply slide the wireless remote control along the body of the extension pole so that the extension pole is being held in a preferred way for each cut while also still controlling the wireless remote control. Without the detachable feature, the user would have to readjust the extension pole before each cut to ensure proper height to allow the user to properly position the blade while still holding the extension pole and operating the remote control simultaneously.

Figure 10:
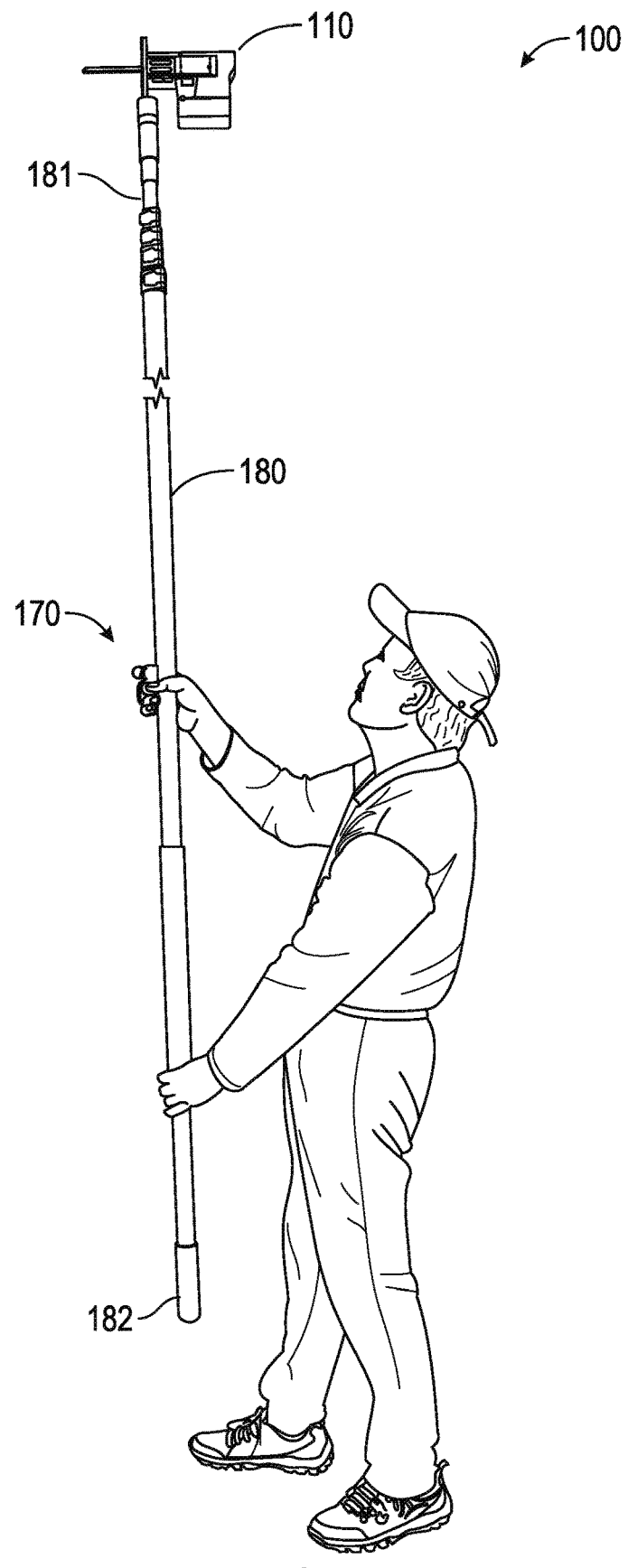
FIG. 10 shows a side view of a user operating the power saw system.

FIG. 10 shows a side view of a user operating the power saw system (100). The user grabs an extension pole (180) with two hands. One of the two hands of the user is located closer to a second end (182) of the extension pole. Another hand of the user is located further from the second end and is simultaneously holding a wireless remote control (170) as described herein. The user is able to easily maneuver a saw head (110) disposed at a first end (181) of the extension pole to cut branches of substantial height. If the user needs to raise or lower the saw head to a different elevation, the user can adjust length of the extension pole or simply slide both hands along the extension pole. The wireless remote control can remain in a same hand and will also slide along the extension pole due to the wireless remote control not being fixedly coupled to the extension pole.

FEATURE LIST power saw system (100)
saw head (110)
housing (111)
proximal end (113)
distal end (114)
main body (115)
motor region (116)
battery compartment (117)
housing battery (118)
faceplate junction (119)
slanted wall (120)
vent inlet (121)
vent outlet (122)
wireless receiver (126)
motor subassembly (130)
motor (131)
motor pinion (132)
key (133)
linear bearings (134)
central drive (135)
drive gear (136)
eccentric roller (137)
clamp (138)
front handle (140; 240)
faceplate (141; 241)
center (142; 242)
ridge (143; 243)
ridge width (144)
ridge inner surface (145)
ridge outer surface (146)
support roller (147; 247)
blade slot (148; 248)
housing attachment apertures (149; 249)
terminal end (150; 250)
pole aperture (151)
blade (160; 260)
blade tip (161; 261)
blade attachment end (162; 262)
wireless remote control (170)
remote housing (171)
remote battery (172)
front side (173)
back side (174)
transmitter (175)
actuator (176)
finger aperture (177)
curved nook (178)
remote switch (179)
extension pole (180)
first end (181)
second end (182)
secondary support roller (252)
index finger (300)
middle finger (301)
ring finger (302)
small finger (303)
thumb (304)

What is claimed is:

1. A power saw system, comprising:
a housing having a proximal end and a distal end opposite the proximal end, the housing comprising a wireless receiver and a motor subassembly;
a housing battery electrically coupled to the wireless receiver;
a front handle comprising a faceplate and a pole aperture disposed at a terminal end of the front handle, the faceplate coupled to the housing wherein the faceplate comprises a blade slot;
a blade extending through the blade slot of the faceplate, the blade coupled to the motor subassembly;
an extension pole comprising a first end and a second end opposite the first end, the first end configured to couple to the pole aperture of the front handle; and
a wireless remote control comprising a remote housing extending from a front side to a back side of the remote housing, the remote housing further comprises a wireless transmitter and a remote battery disposed within the remote housing, the wireless transmitter being configured to communicate with the wireless receiver and further configured to be held against the extension pole during operation;
wherein the blade is configured to move upon actuation of the wireless remote control.

2. The power saw system of claim 1, the wireless remote control further comprising a finger aperture extending through the remote housing.

3. The power saw system of claim 2, the wireless remote control further comprising a curved nook disposed below the finger aperture.

4. The power saw system of claim 2, the wireless remote control further comprising an actuator disposed on the front side of the remote housing wherein the actuator is positioned above the finger aperture.

5. The power saw system of claim 4, wherein the actuator comprises a throttle.

6. A power saw system, comprising:
a housing having a proximal end and a distal end opposite the body proximal end, the housing comprising a wireless receiver and a motor subassembly;
a housing battery electrically coupled to the wireless receiver;

a front handle comprising a faceplate and a pole aperture disposed at a terminal end of the front handle, the faceplate coupled to the housing wherein the faceplate comprises a blade slot, and further wherein the pole aperture is configured to receive an extension pole;

a blade extending through the blade slot of the faceplate, the blade coupled to the motor subassembly; and a wireless remote control comprising a remote housing extending from a front side to a back side of the remote housing, the remote housing further comprises a wireless transmitter and a remote battery disposed within the remote housing, wherein the wireless transmitter is configured to communicate with the wireless receiver;

wherein the blade is configured to move upon actuation of the wireless remote control.

7. The power saw system of claim 6, the wireless remote control further comprising a finger aperture extending through the remote housing.

8. The power saw system of claim 7, the wireless remote control further comprising a curved nook disposed below the finger aperture.

9. The power saw system of claim 7, the wireless remote control further comprising an actuator disposed on the front side of the remote housing wherein the actuator is positioned above the finger aperture.

10. The power saw system of claim 9, wherein the actuator comprises a throttle.

11. The power saw system of claim 6, wherein the back side of the remote housing is configured to removably engage with the extension pole to allow gripping of the wireless remote control and the extension pole to be held in a same hand of a user.

12. The power saw system of claim 6, the faceplate further comprising a ridge extending along a center of the faceplate, the ridge comprising a ridge inner surface facing the housing, a ridge outer surface opposite the ridge inner surface, and a ridge width.

13. A power saw, comprising:
a housing having a proximal end and a distal end opposite the body proximal end, the housing comprising a wireless receiver and a motor subassembly;
a housing battery electrically coupled to the wireless receiver;
a front handle comprising a faceplate and a pole aperture disposed at a terminal end of the front handle, the faceplate coupled to the housing wherein the faceplate comprises a blade slot, and further wherein the pole aperture is configured to receive an extension pole; and
a blade extending through the blade slot of the faceplate, the blade being coupled to the motor subassembly.

14. The power saw of claim 13, the faceplate further comprising a ridge extending along a center of the faceplate, the ridge comprising a ridge inner surface facing the housing, a ridge outer surface opposite the ridge inner surface, and a ridge width.

15. The power saw of claim 14, the housing further comprising a housing width wherein the housing width is greater than the ridge width.

16. The power saw of claim 14, further comprising a support roller coupled to the ridge inner surface, the support roller configured to engage with the blade to provide stability.

17. The power saw of claim 16, further comprising a secondary support roller coupled to the ridge inner surface, the secondary support roller disposed on an opposite side of the blade from the support roller.

18. The power saw of claim 13, the housing further comprising a main body, a battery compartment configured to hold the housing battery, and a faceplate junction wherein the battery compartment is disposed below the main body.

19. The power saw of claim 18, wherein the battery compartment is removably coupled to the main body.

20. The power saw of claim 18, the main body further comprising a motor region configured to surround a motor of the motor subassembly, the motor region comprising a slanted wall and a vent outlet disposed on a widest portion of the slanted wall.

* * * * *